3,427,190
PROCESS FOR FORMING A CORROSION RESISTANT EPOXY RESIN COATING ON A METAL SURFACE
Robert E. Murdock, Scotch Plains, N.J., assignor to Shell Oil Company, New York, N.Y., a corporation of Delaware
No Drawing. Filed Aug. 11, 1964, Ser. No. 388,914
U.S. Cl. 117—132                             2 Claims
Int. Cl. B44d 1/09; C23f 15/00

This invention relates to new compositions which are useful for the treating of wet surfaces and to a method for their preparation. More particularly, the invention relates to new and improved epoxy resin compositions which are particularly useful for treating surfaces which are in contact with fresh water to impart corrosion resistance thereto, and to a method for preparing the new compositions.

Specifically, the invention provides new and particularly useful compositions which are particularly useful for the treatment of surfaces which are in contact with fresh water to impart a hard tough flexible resistant coating thereto, which compositions comprise a mixture of (1) a polyepoxide having more than one vic-epoxy group, (2) an excess of material which acts both as a surface active material to dry the surface and to convert the polyepoxide to an insoluble product, and preferably an amino-nitrogen-containing polyamide and (3) a salt of a polybasic acid.

As a special embodiment, the invention provides a process for utilizing the above-described compositions to form a hard tough corrosion resistant coating to surfaces which are in contact with water and particularly metal sufaces which are immersed in fresh water, such as bridge pilings, drilling rigs and the like, which comprises forming a putty-like mixture of a polyepoxide, polyamide and salt of the polybasic acid, applying the said putty-like mixture to the surface while it is in contact with the water and then allowing the coating to set hard while in contact with the water.

There is a growing need in industry for a superior plastic coating material that can be applied to surfaces while wet or while submerged under water so as to repair defects therein and/or apply a corrosion resistant coating thereto. This includes, for example, repair of leaks in water lines without interruption of the water flow, repair of electrical conduits buried in wet soil, repair of boat hulls while the boat is still in the water, repair of water-wetted surfaces of pressure vessels, and the like, as well as applying corrosion-resistant coatings to the aforedescribed materials.

One of the greatest problems has been the prevention of corrosion of metal members of off-shore drilling structures, particularly those parts disposed in the splash zone, i.e., disposed in the vicinity of the water line. The corrosion of metal members in this area is particularly severe. If a metal member extends from the bottom to a point above the water level, the general pattern of its relative losses of metal due to corrosion usually has the following general characteristics; the corrosion rate is relatively low along those portions of the metal member which is within and immediately above the bottom sediments in which the member is disposed. Proceeding upwardly through the zone between the mud line and the low-tide water level, the rate of corrosion undergoes a relatively sudden and severe increase along a portion of the metal member which is located just below the low-tide water level and is generally continuously submerged. Further up, the corrosion rate may drop off along a short section between the low-tide and high-tide water levels, and then increase to a rate which usualy exceeds the corrosion rate anywhere else along the metal member, this maximum being within the zone in which the member is subject to the action of waves. Above this zone, the metal member is subjected to atmospheric corrosion in which the metal is in contact with the moist air and some spray action normally existing above a body of water. The corrosion rate is high, and corrosion protection is needed along all of the portions of such metal members which are wetted and exposed to relatively high oxygen concentrations. Such portions include those portions of the metal which are substantially continuously immersed in water which has a relatively high concentration of dissolved and/or entrained oxygen.

It has been unexpectedly found that the above-described problem can be solved in large measure by the use of a special composition containing polyepoxide and a polyamide or polyamine such as described in copending applications Ser. No. 139,605, now U.S. 3,159,499 and Ser. No. 139,604, filed Sept. 21, 1961, now U.S. 3,160,518. These compositions however have certain limitations particularly when applied in the presence of fresh water. It has been found, for example, that in the presence of fresh water there is a certain loss of vital components in the compositions so that the degree of cure obtained is not as high as desired.

It is, therefore, an object of the invention to provide a new type of composition for treating wet surfaces. It is a further object to provide low cost compositions suitable for treating surfaces in contact with water. As a further object to provide compositions for treating surfaces while in contact with fresh water which can be readily cured to form outstanding corrosion resistant coatings. It is a further object to provide a process for treating surfaces while in contact with fresh water to impart a corrosion resistant coating thereto. It is a further object to provide a new process for providing surfaces which are disposed in fresh water which permits a rapid and complete cure of the coating. It is a further object to provide a new process for applying corrosion resistant coatings which have excellent flexibility and distensibility. It is a further object to provide a new process for treating wet surfaces to repair defects therein. It is a further object to provide a new process for treating wet surfaces to make them water tight and corrosion resistant. These and other objects of the invention will be apparent from the following detailed description thereof.

It has now been discovered that these and other objects may be accomplished by the compositions of the invention which comprise a mixture of (1) a polyepoxide having more than one vic-epoxy group, (2) an excess of a material which acts both as a surface active material to dry the surface and to convert the polyepoxide to an insoluble infusible product, and preferably a polyamide containing an amino hydrogen, and (3) a salt of a polybasic acid. It has been found that this special composition can be applied even in the presence of fresh water to various types of surfaces to form a highly corrosive coating thereon. This material is particularly effected when applied to wet surfaces or to surfaces which are totally submerged under water. The coatings have excellent adhesion to the surfaces and cure under water to give a hard tough film which has good flexibility and distensibility.

It has also been surprisingly found that the process is effective for repairing defects in wet surfaces, such as holes, cracks, pits and the like. When the compositions are applied to the surfaces when wet or submerged under water, the coatings fill the holes or cracks and can be leveled to form a smooth coating. The process can thus be used both for repair and for application of corrosion resistant coatings to boat hulls, water pipes, electrical conduits, pilings and the like. The process can also be used for the treatment of heat exchange tubes, heat exchange tube sheets, heads and the like. The compositions form a strong corrosion resistant coating and in addition inhibit the formation of mineral scale depositions during operation of the heat exchanger.

While the role of the salts of polybasic acid is not thoroughly understood, it has been found that the presence of these materials brings about an unexpected decrease in loss of materials when in contact with fresh water.

One component of the new compositions comprises a salt of a polybasic acid. The acid may be inorganic or organic and may be monomeric or polymeric. Examples of such acids include, among others, citric acid, maleic acid, adipic acid, sebacic acid, phthalic acid, isophthalic acid, chloromaleic acid, 1,12-dodecanedioic acid, 1,20-eicosanedioic acid, adducts of maleic acid with unsaturated compounds, and the like, and inorganic acids, such as phosphoric acid, sulfuric acid, pyrophosphoric acid, fluoboric acid, boric acid, and the like.

The metal portion of the above-described salts may be monovalent or polyvalent and may be of various molecular weights. Examples of such metals include, among others, sodium, potassium, lithium, and metals such as zinc, iron, copper, aluminum, chromium, lead, tin and the like. Particularly preferred metals comprise the alkali and alkaline earth metals.

Examples of suitable salts include, among others, sodium and potassium citrate, sodium and potassium phosphate, sodium and potassium pyrophosphate, zinc phosphate, copper phosphate, iron fluoborate, zinc fluoborate, potassium maleate, sodium adipate, potassium phthalate, calcium chloromaleate, iron 1,12-dodecanedioate, and the like.

The amount of the salt of the polybasic acid to be used in the composition may vary over a wide range. It is generally preferred to employ the salts in minor amounts and preferably from about .1% to 5% by weight of the mixture.

The polyepoxides used in the process of the invention comprise those organic materials possessing more than one vic-epoxy group, i.e., more than one

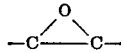

group. These materials may be saturated or unsaturated, aliphatic, cycloaliphatic, aromatic or heterocyclic and may be situated with substituents, such as chlorine, hydroxyl groups and ether radicals. They should not, however, possess active groups, such as isocyanate groups, which are reactive with water.

For clarity, many of the polyepoxides and particularly those of the polymeric type will be described in terms of epoxy equivalent value. The meaning of this expression is described in U.S. Patent No. 2,633,458.

If the polyepoxide consists of a single compound and all of the epoxy groups are intact, the epoxy equivalency will be integers, such as 2, 3, 4 and the like. However, in the case of polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material, may, for example, have epoxy equivalent values, such as 1.5, 1.8, 2.5 and the like.

Examples of the polyepoxides include, among others, 1,4-bis(2,3-epoxypropoxy)benzene,
1,3-bis(2,3-epoxypropoxy)benzene,
4,4'-bis(2,3-propoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-chlorocyclohexane,
1,3-bis(2-hydroxy-3,4-epoxybutoxy)benzene, and
1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (bisphenol-A), 2,2-bis(4-hydroxyphenyl)butane, 4,4'-dihydroxybenzophenone, bis-(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

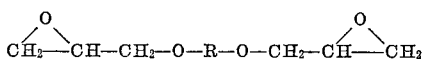

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A 1 mol of bis-phenol was dissolved in 10 mols of epichlorohydrin and 1 to 2% water added to the resulting mixture. 5% by weight phenol was added to the mixture. The combined mixture was then placed in a kettle provided with heating and cooling means, agitator, distillation condenser and receiver. The mixture was brought to 80° C. and 2 mols of solid sodium hydroxide added in small portions. Sufficient cooling is applied during the addition so that the temperature is maintained at about 95–97° C. and there is a gentle distillation of epichlorohydrin and water. After the last addition of sodium hydroxide with the completion of the reaction, the excess epichlorohydrin is removed by vacuum distillation. After completion of the distillation, the residue is cooled to about 90° C. and about 300 parts of benzene added.

Cooling drops the temperature of the mixture to about 40° C. with precipitation of salt from the solution. The salt is removed by filtration and the removed salt carefully washed with about an additional 300 parts of benzene to remove polyether therefrom. The two benzene solutions were combined and distilled to separate the benzene. When the kettle temperatures reached 125° C., vacuum is applied and distillation. The resulting product is a liquid composition containing glycidyl polyether of bisphenol having the following properties: Epoxy value of 0.541 eq./100 g., color 6 (Gardner), chlorine (percent w.) 0.24, viscosity 70 poises.

Polyether B

A solution consisting of 11.7 parts of water, 1.22 parts of sodium hydroxide, and 13.38 parts of 2,2-bis(4-hydroxyphenyl) propane was prepared by heating the mixture of ingredients to 70° C. and the cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes and cooled rapidly. At room temperature the product was an extremely viscous semi-solid having a melting point of 27° C. by Durran's Mercury Method and a molecular weight of 483. The product had an epoxy value eq./100 g. of 0.40. For convenience, this product will be referred to as Polyether B.

Preferred members of the above-described group of polyepoxides are the glycidyl polyethers of the dihydric phenols, and especially 2,2-bis(4-hydroxyphenol)propane, having an epoxy equivalency between 1.0 and 2.0 and a molecular weight between 250 and 900. Particularly preferred are those having Durran's Mercury Method softening point no greater than 80° C.

The glycidyl polyethers of polyhydric phenols obtained by condensing the polyhydric phenols with epichlorohydrin as described above are also referred to as "ethoxyline" resins. See Chemical Week, vol. 69, p. 27, for Sept. 8, 1951.

Another group of polyepoxides comprises the glycidyl ethers of novalac resins which resins are obtained by condensing an aldehyde with a polyhydric phenol. A typical member of this class is the epoxy resin from formaldehyde 2,2-bis(4-hydroxyphenyl)propane novalac resin.

The material to be used to combine with the above-described polyepoxides comprise materials which act both as a surface active material to "dry" the surface as a material to convert the polyepoxide to an insoluble infusible form. Preferred materials include those organic materials possessing a plurality of amino hydrogen, i.e., a plurality of

groups wherein N is an amino nitrogen. These include the aliphatic, cycloaliphatic aromatic or heterocyclic polyamines as well as derivatives thereof as long as the derivative still contains the necessary amino hydrogen.

Examples of these materials include, among others, the aliphatic polyamides, such as, for example, ethylene diamine, diethylene triamine, triethylene tetramine, tetraethylene pentamine, 1,4-aminobutane, 1,3-diaminobutane, hexamethylene diamine, 3 - (N - isopropylamino)propylamine, N,N'-diethyl-1,3-propanediamine, hexapropylene heptamine, penta(1-methyl-propylene)hexamine, tetrabutylenepentamine, hexa-(1,1-dimethylethylene)-heptamine, di(1-methylbutylene)triamine, pentaamylhexamine, tri(1,2,2-trimethylethylene)tetramine, tetra(1,3 - dimethylpropylene)pentamine, penta(1,5-dimethylamylene)hexamine, penta-(1,2-dimethyl - 1 - isopropylethylene)hexamine and N,N'-dibutyl-1,6-hexanediamine.

Aliphatic polyamines coming under special consideration are the alkylene polyamines of the formula

wherein R is an alkylene radical, or a hydrocarbon-substituted alkylene radical, and $n$ is an integer of at least one, there being no upper limit to the number of alkylene groups in the molecule.

Especially preferred aliphatic polyamines comprise the polyethylene polyamines of the formula

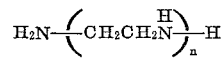

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

| | Percent by weight |
|---|---|
| Carbon | 51.5 |
| Nitrogen | 34.3 |
| Hydrogen | 11.6 |
| Oxygen | 2.5 |

Total basicity, equivalents per 100 grams=1.98, equivalent to 27.7% nitrogen.

| | | |
|---|---|---|
| Active nitrogen | percent | 81 |
| Viscosity | poises | 72–250 |
| Equivalent weight | percent | 42.5 to 47.5 |

This mixture of polyamines will be referred to hereinafter as Polyamine H.

Other examples include the polyamines possessing cycloaliphatic ring or rings, such as, for example, 1-cyclohexylamino-3 - aminopropane, 1,4 - diaminocyclohexane, 1,3 - diaminocyclopentane, di(aminocyclohexyl)methane, di(aminocyclohexyl)sulfone, 1,3 - di(aminocyclohexyl)-propane, 4-isopropyl-1,2-diaminocyclohexane, 2,4-diaminocyclohexane, N,N' - diethyl - 1,4 - diaminocyclohexane, and the like. Preferred members of this group comprise those polyamines having at least one amino or alkyl-substituted amino group attached directly to a cycloaliphatic ring containing from 5 to 7 carbon atoms. These cycloaliphatic amines are preferably obtained by hydrogenating the corresponding aromatics amine. Thus di(aminocyclohexyl)methane is obtained by hydrogenating methylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilyl-propylamines as triethoxysilylpropylamines.

Still another group comprises the aminoalkyl-substituted aromatic compounds, such as, for example, di(aminoethyl)benzene, di(aminomethyl)benzene, tri(aminoethyl) benzene, tri(aminobutyl)naphthalene and the like.

Still another group comprises the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl - 3-butoxypiperazine, N-aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cured obtained, are the acetone soluble derivatives of the above polamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidylether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N(hydroxypropyl) diethylene triamine (reaction product of propylene oxide and diethylene triamine) and N(2-hydroxy-4-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di (tertbutyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Another group of derivatives that may be used in the process of the invention include those soluble and fusible products obtained by reacting the polyamines noted above with unsaturated nitriles, such as, acrylonitrile. Examples of such products include the cyanoethylated diethylene triamine, cyanoethylated triethylene tetramine, cyanoethylated hexamethylene diamine, cyanoethylated 1,3-propanediamine and cyanoethylated 1,3-diaminocyclohexane. Preferred species of the cyanoalkylated polyamines include those of the formula

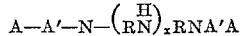

wherein $x$ represents an integer in the range of 0 through 3 and A and A' represent a member selected from the group consisting of hydrogen and cyanoethyl radicals, and further characterized in that the amine has at least one cyanoethyl group and at least one nontertiary amino group in the molecule. Especially preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula

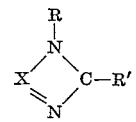

wherein X is an organic radical, and preferably an alkylene radical. R' is a long chain hydrocarbon radical, and preferably one containing at least 12 carbon atoms, and R is an organic radical containing an amine or amine substituted group. Particularly preferred members of this group are those obtained by reacting any of the above-described polyamines with long chain monocarboxylic acids, such as those containing at least 12 and preferably 16 to 30 carbon atoms, such as, for example, palmitic acid, pentadecanoic acid, 4-ketomyristic acid 8,10-dibromostearic acid, margaric acid, stearic acid, alphachlorostearic acid, linoleic acid, oleic acid, dihydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorus containing polyamines, such as may be obtained by reacting a mercaptan or phoshpine containing active hydrogen with an epoxy halide to form a halohydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds include, among others, N-(3-butylthio-2-hydroxypropyl)triethylene tetramine,
N-(4-phenylthio-3-hydroxybutyl)pentamethylene tetramine,
N-(4-cyclohexylthio-3-hydroxybutyl)ethylene diamine,
N-(3-cyclohexylthio-2-hydroxypropyl)hexamethylene diamine,
N-(3-diphenylphosphino-2-hydroxypropyl)triethylene tetramine,
N-(3-dicyclohexylphosphino-2-hydroxypropyl)pentamethylene tetramine,
N-(3-didodecylphosphino-3-hydroxyhexyl)diethylene triamine, and
3-(allylthio-2-hydroxypropyl)hexamethylene diamine.

Coming under special consideration are the N-(alkylthiohydroxyalkyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorus containing curing agents include the N-(dialkylphosphinohydroxyalkyl) aliphatic and aromatic polyamines, the N-(dicycloalkylphosphinohydroxyalkyl) aliphatic and aromatic polyamines, and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylate and the like. In this case there is an exchange of the ester linkage for an amide linkage, one of the polyamine nitrogen being involved in the said amide linkage.

Particularly preferred polyamines and derivatives to be used with the above-described polyepoxides comprise the aliphatic and cycloaliphatic polyamines of the formula

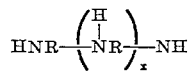

wherein $x$ is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitrils containing 1 to 6 carbon atoms and monocarboxylic acids containing up to 20 carbon atoms.

Other amino-nitrogen-containing curing agents the polyamides and particularly the reaction products of a polycarboxylic acid containing at least 7 carbon atoms and preferably those containing at least seven carbon atoms between the acidic groups, and an aliphatic polyamine, the resulting product possessing a group reactive with epoxy groups, such as, for example, free amino groups or free carboxyl groups.

Examples of polybasic acid materials used in making these polyamides includes, among others, 1,10-decanedioic acid, 1,12-dodecadienedioic acid, 1,20-eicosadienedioic acid, 1,14-tetradecanedioic acid, 1,18-octadecanedioic acid and dimerized and trimerized unsaturated fatty acids obtained by heating polymerizing drying oil fatty acids under known conditions. Normally, this is effected by utilizing the lower aliphatic esters of drying oil esters so as to prevent decarboxylation during the heating period. During the heating period, dimers and trimers are usually obtained. The process is illustrated in the "Industrial and Engineering Chemistry," vol. 38, p. 1139 (1946). The structures of the products so obtained are believed to be those given in "Industrial Engineering Chemistry," vol. 33, p. 89 (1941). Numerous drying oil acids can be used in preparing the polymerized acids, but the preferred acids are those containing from 16 to 24 carbon atoms, such as, for example, linoleic acid, linolenic acid, eleostearic acid, and licannic acid, such as may be derived from oils, such as soybean oil, linseed oil, tung oil, perilla, oiticica, cottonseed, corn, tall, sunflower, dehydrated castor oil and the like. The expression "polymerized unsaturated fatty acids" as used herein in a generic sense is intended to include the polymerized mixture of dimerized acids, trimerized acids, higher polymerized acids as well as small portions of residual monomer.

The aliphatic polyamines used in preparing the polyamides may be any di-, tri- or polyamine such as, for example, ethylene diamine, diethylene triamine, triethylene tetramine, tetraethylene pentamine, 1,4-diaminobutane, 1,3-diaminobutane, hexamethylene diamine, 3-(N-isopropylamino)propylamine, and the like. Particularly preferred polyamines are those containing from 2 to 12 carbon atoms, and especially those of the formula

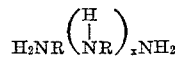

wherein $x$ is an integer of 0 to 10 and R is a bivalent hydrocarbon radical containing from 1 to 10 carbon atoms. Coming under special consideration are those polyamines having at least 3 atoms intervening between the amine groups principally involved in the amidification reaction. These three atoms may be carbon atoms or hetero atoms, such as nitrogen atoms.

Especially preferred polyamides are those derived from the aliphatic polyamides containing no more than 12 carbon atoms and polymeric fatty acids obtained by dimerizing and trimerizing ethylenically unsaturated fatty acids containing up to 24 carbon atoms. These preferred polyamides have a viscosity between 10 and 1750 poises at 40° C., and preferably 20 to 250 poises at 40° C. Preferred polyamides also have amine values between 50 and 450. Amine number is number of milligrams of KOH equivalent to the free amino groups present in one gram of the polyamide.

Coming under special consideration are the fluid polyamides produced by the condensation of polymerized linoleic acid with an aliphatic polyamine, e.g., diethylene triamine, and having the following properties: amine value 210–230, viscosity of 500–750 poises at 40° C., specific gravity of 0.99 and weighing about 8.3 pounds per gram.

The polyamides used in the process of the invention preferably possess at least one and more preferably two or more hydrogen attached to amino nitrogen atoms or carboxyl hydrogen atoms. Such products are obtained by controlling the proportion of reactants so that there is always at least one amino hydrogen or carboxyl group, such as, for example, by using an excess of the polyamine reactant. A process for making such polyamides (to obtain free amino groups) or an excess of acid (to obtain carboxyl groups) is illustrated in U.S. 2,450,940 and U.S. 2,695,908 and so much of the disclosure of these patents relative to the preparation of the polyamides is incorporated herein by reference.

The proportions of the polyepoxide and the curing agent to be used in the compositions of the invention should be maintained within controlled ranges in order to obtain the above-noted superior results. The amount of the curing agent employed so as to be freely available to "dry" the surface, for example, should be at least a 5% stoichiometric excess and not more than 50% stoichiometric excess in relation to the polyepoxide. As used herein as in the appended claims stoichiometric amount refers to that amount needed to furnish one amino hydrogen for every epoxy group to be reacted. Particularly superior results are obtained when the curing agent is employed in from 10% to 40% stoichiometric excess.

Other materials may also be included in the compositions of the present invention. Materials which are particularly desirable for use, especially when the coatings are to be applied while the surface is immersed under water, are those which impart thixotropic properties to the composition. Examples of these include, among others, silicas, silicates, non-fibrous asbestos, silica aerogels, montmorillonite clay minerals as bentonite and the like. These materials are preferably finely divided and preferably have particles of up to 50 microns in size. Particularly preferred materials to be utilized include the finely divided colloidal materials which swell in the presence of water, and especially those having a heat of interaction with the polyepoxide of less than 300 ergs/sq./cm. These thixotropic materials are preferably utilized in amounts up to about 10% by weight of the combined mixture, and still more preferably in amounts varying from about 0.1% to 5% by weight.

Other materials to be added also include inert fillers, such as sand, crushed shells, rocks, aluminum powder, iron particles and the like.

Other materials that may be used in the composition include those which tend to extend the polyepoxide but do not seriously affect the properties of the cured product, such as, for example, coal tars, asphalts, road oils, extracts and the distillates, middle oil, refined coal tars, pine tars and oil, and the like as well as other types of resins as phenol-aldehyde resins, phenol-urea resins, polythiopolymercaptans, vinyl resins, polyolefins, synthetic rubbers, and the like and mixtures thereof. Particles of solid resins as particles of nylons, rayons, Dacrons, and the like may also be added for strength. These other materials are preferably employed in amounts less than 60% by weight of the polyepoxide, and more preferably not more than 40% by weight of the polyepoxide.

Other materials that may be used include pigments, plasticizers, stabilizers, fungicides, insecticides, activators for the cure of the epoxy resins, such as, for example, phenols, amines, acids, salts, thiols, sulfides, and the like, and mixtures thereof. Other types of curing agents for the polyepoxides may also be used in combination with the above-noted polyamides as long as the polyamides make up at least 50% by weight of the combined curing agent.

The compositions may be prepared by any suitable method. They may be prepared, for example, by merely mixing the polyepoxide, curing agent and pulverized salt of the polybasic acid together in the above-noted proportions along with any of the above-described materials, such as fillers, thixotropic agents, pigments and the like. It is sometimes desirable to prepare the polyepoxide along with fillers, thixotropic agents, pigments and the like. It is sometimes desirable to prepare the polyepoxide along with fillers, thixotropic agents, pigments and the like in a separate composition and the curing agent and salt in a separate composition along with desired fillers, thixotropic materials and pigments, and then mix the two compositions together just before application is needed. This is preferred as it gives more time to work with the composition before it sets up to the hard insoluble material.

The viscosity of the compositions used in the process of the invention will depend upon the viscosities of the polyepoxide and polyamide used in the mixture and the amount of added fillers and the like added. If thicker more putty-like compositions are needed, they may be prepared by the addition of more fillers or thixotropic agents. In general, putty-like compositions are obtained by adding from 20% to 150% by weight of the polyepoxide and polyamide of the filler materials. On the other hand, if more fluid compositions are needed as for brushing, etc. one may add more fluid polyepoxides, such as, for example, glycidyl ethers of polyhydric alcohols, diglycidyl ether, polyglycidyl esters of lower acids and the like, until the desired fluidity is obtained.

The above-noted compositions are applied to the water-wetted surface when the surface is in contact with any amount of water, e.g., the surface may just have a layer of water say several molecules thick, or the surface may be totally immersed in fresh or saline water. When the surface is in contact with only a small amount of water, the composition may be applied by simply brushing, spraying or otherwise applying the composition. However, when the surface is under water and exposed to considerable movement of the water, a putty-like material is prepared and applied to the surface as by hand or other suitable techniques so as to force the composition on the surface to be coated and form a continuous layer thereon.

The thickness of the coating on the surface will depend on the desired need of the application. The coating may, for example, vary from just a few mils thickness up to as high or higher than one inch thickness. The edges of the coatings are preferably feathered down so as to make a secure seal on the surface.

If the surface to be coated has already been corroded or is coated with oils and the like, it is preferred to clean the surface before application of the coatings of the invention. This may be accomplished by any suitable means, such as steel brushing, sandblasting, etching with acids, cleaning with organic solvents and the like.

After the material has been coated with the desired coating, the coating is then allowed to set until it has become cured to the insoluble infusible state, e.g., is insoluble in acetone and does not soften when heated say to 100° C. The curing takes place at normal temperatures so no external steps need be taken to effect cure. Heat, of course, will speed the cure, and if possible applications, such as heat lamps and the like, might be utilized to speed the setting up of the coating. Under ordinary application conditions, the coating will generally harden by being allowed to set say in from 4 to 24 hours after mixing.

The process of the invention is particularly adapted for use in the protection of metal structures disposed offshore and subjected to the action of fresh or salt water, this process including the steps of mixing a polyepoxide, curing agent, salt and filler material which proportions are selected to form a putty-like composition which preferentially wets metal surfaces and becomes substantially rigid in from about 4 to 24 hours after mixing, and applying a coating of said putty-like composition on surfaces of metal members to be protected, which surfaces are located between the upper level reached by waves and a level at least one foot below the low-tide water line, by forcing said putty-like composition to contact said metal surfaces and form into a continuous layer along which there is substantially continuous composition-to-metal contact.

In treating a vertical metal member which extends through the water line of an offshore structure, the surfaces of the member to be protected are cleaned from a level as high as the anticipated lapping of the waves, or splashing of the water, to a level which is at least about a foot below the low-tide water line, said cleaned surface being then coated with a layer of the aforesaid self-hardening mixture.

One of the preferred methods of applying the mixture to the structural member is to first form a ring of the material or mixture on the structural member at a point somewhat above the highest point to which water may splash, then smearing the material downwardly and uniformly a foot or so below the low-tide water level with the bottom edge of the plastic feathered to the metal member to be protected. The composition used for this protection of metal structural members is readily molded in place by the use of the applicator's hands, particularly when the latter are wet. The application of the subject compositions to complex geometric structures is easy and readily accomplished by the use of techniques similar to those employed in applying putty.

As noted, the process of the invention is also particularly adapted for use in the repairing of defects in surfaces, such as holes, cracks and the like and optionally placing of a corrosion resistant coating on such surfaces at the same time. This is accomplished by preparing the composition as noted above and then applying the composition to the defective surface. If the defects are very fine cracks, and the wet surfaces are not exposed to much action of the water, the composition may be of the fluid type so as to file the cracks and defects. If the cracks are very large and/or if the action of the water is very strong it may be necessary to employ the composition in the form of a thick putty as described above. After the composition has been applied to the defect so as to effect the repair, the surface may then be coated to effect the direct corrosion prevention. In some cases, in repairing the defects in the pressure of water, it may be desirable to speed cure of the composition so as to more efficiently close the crack or hole. This may be accomplished by the addition of cure accelerators noted above, such as phenols, thiols and the like.

The process of the invention may be used for the coating and/or repair of any surface. Such surfaces include, among others, wood, cement, plaster, metal, glass and the like. The process is particularly suited for use in treating metal surfaces, such as, for example, copper, aluminum, brass and iron surfaces. The process has shown especially superior results when used for the treatment of ferruginous metal surfaces. The surfaces may be in any type of structure, such as, for example, pipes, boats, pilings, reaction vessels, structural members of oil well drilling platforms, well jackets, collection platforms and the like.

To illustrate the manner in which the invention may be carried out, the following examples are given:

It is to be understood, however, that the examples are for the purpose of illustration and that the invention is not to be regarded as limited to any of the specific materials or conditions recited therein. The polyepoxides referred to by letter such as Polyether A are those described in U.S. 2,633,458. Unless otherwise indicated, parts described in the examples are parts by weight.

EXAMPLE I

This example illustrates the preparation of a coating composition containing Polyether A, a polyamide of dimerized linoleic acid and diethylene triamine, and sodium citrate, and the use of this composition for treating metal surfaces disposed in fresh water.

A composition A was prepared by mixing the following components together in the proportions shown:

| Components: | Parts |
|---|---|
| Polyamide of dimerized linoleic acid and diethylene amine having an amine value of 306 | 80 |
| Talc | 10 |
| Barits | 10 |
| Pigment | 1 |
| Sodium citrate | .1 |

Composition B was prepared by mixing the following components together in the proportions shown:

| | Parts |
|---|---|
| Polyether A | 18 |
| Talc | 18 |
| Pigment | 1 |
| Triphenyl phosphite | 1.8 |

The above compositions were mixed together in substantially equal parts by volume. The resulting composition was a putty-like material which could be easily formed by hand and when allowed to stand set up to a hard tough flexible insoluble infusible material.

The above-described uncured composition was applied by hand to the surface of steel pipe which had been immersed in a tank of fresh water. The surface of the pipe had been previously scraped and wire brushed to remove most of the rust. The coating was applied to surfaces under the water and to the splash zone which was at the surface and slightly above. The composition was applied under the water line by applying pressure to squeeze the water away from the surface of the pipe and established substantially continuously composition to metal contact under the layer of the coating material. No difficulty was encountered in having the coating adhere to the members and the plastic coating was fully cured in about 24 hours to form a hard tough and highly distensive coating. The above coating was inspected several months after application and found to be in excellent condition. The coating had withstood considerable pressures and because of its good distensibility had not chipped or peeled off. The adhesion was excellent and the coating provided complete corrosion protection.

EXAMPLE II (A) This example further illustrates the preparation of a coating composition containing Polyether A and a polyamide of dimerized linoleic acid and diethylene triamine and sodium pyrophosphate and the superior properties of the composition as a coating for steel pipes in splash zones.

Composition A was prepared by mixing the following components together in the proportions indicated:

| | Parts |
|---|---|
| Polyether A | 40.4 |
| Triphenyl phosphite | 3.7 |
| Cab-O-Sil (thixotropic agent) | 47.5 |
| Chrome yellow pigment | 3.4 |
| Sodium pyrophosphate | 5.0 |
| | 100.0 |

Composition B was prepared by mixing the following components together in the proportions indicated:

| | Parts |
|---|---|
| Polyamide of dimerized linoleic acid and diethylene triamine having an amine value of 306 (Versamid 125) | 42.3 |
| Silica filler | 12.7 |
| Cab-O-Sil (thixotropic agent) | 44.8 |
| Lamp black | .2 |
| | 100.0 |

Compositions A and B were then mixed together in a weight ratio of 1:1.1. The resulting mixture was a putty-like composition which would be easily formed by hand. When allowed to set, the mixture set up in 4 to 10 hours to form a hard tough flexible insoluble infusible material.

The above uncured composition was applied by hand to a steel pipe disposed in an accelerated splash zone corrosion test apparatus containing fresh water. The coating remained intact with no slumping or running and set to form hard tough flexible coating in 12 to 18 hours. The pipe was retained in the apparatus where it was exposed to the fresh water under accelerated splash zone conditions for seven days. The water was kept at 70° F. for 24 hours and then the temperature raised to 150° F. to accelerate the test. At the end of the 7 days, the coating demonstrated excellent adhesion, toughness and distensibility and excellent corrosion protection.

EXAMPLE III

Example II was repeated with the exception that the salt employed was potassium phosphate. Related results are obtained.

EXAMPLE IV

Example III was repeated with the exception the the salt employed was sodium tartrate. Related results are obtained.

EXAMPLE V

Example II is repeated with the exception the the curing agent employed was diethylene triamine. Related results are also obtained.

EXAMPLE VI

Example II was repeated with the exception that Polyether A was replaced with an 85–15 mixture of Polyether A and butyl glycidyl ether. Related results are obtained.

EXAMPLE VII

Example II is also repeated with the exception that Polyether A is replaced with diglycidyl ether of resorcinol. Related results are also obtained.

EXAMPLE VIII

Example II was repeated with the exception that the polyamide was replaced by a mixture of polyamides of dimerized and trimerized linoleic acid and diethylene triamine. The mixture of polyamides had an amine value of 250. Related results are obtained.

EXAMPLE IX

Example II is repeated with the exception that the polyamide is replaced by a polyamide of eicosanedioic acid and ethylene diamine. Related results are obtained.

EXAMPLE X

Composition A was prepared by mixing the following components in the proportions indicated:

| | Percent |
|---|---|
| Mixture of Polyether A and butyl glycidyl ether 85–15 | 30 |
| Triphenyl phosphite | 6 |
| Asbestos | 12 |
| Aluminum powder | 10 |
| Sodium citrate | 3 |

Composition B was prepared by mixing the following components in the proportions indicated:

| | Percent |
|---|---|
| Polyamide of dimerized linoleic acid and diethylene triamine having an amine value of 306 | 15 |
| Polyamide of dimerized linoleic acid and diethylene triamine having an amine value of 216 | 15 |
| Aluminum powder | 10 |
| Yellow pigment | 1.7 |

The two compositions above were mixed together in substantially two parts of B to 1 part A by volume. The resulting composition was a putty-like composition which could be easliy formed by hand an when allowed to stand set up to a hard tough distensible composition.

The above composition was applied to the steel pipe submerged in fresh water as shown in Example I. The coating did not slump or run and set hard under the water to form a hard tough distensible coating.

EXAMPLE XI

The coating compositions shown in Examples I, II and X are applied to iron and copper water piping which have water leaking through small holes. The coatings set up in a few hours to seal the holes and furnish a hard tough flexible corrosion-resistant coating for the pipes.

EXAMPLE X

The coating compositions shown in Examples I, II and X are also applied to the side of a metal hull of a coat while in the water so as to effect a repair of a small hole therein. A successful patching and coating of the hole is obtained.

It has also been unexpectedly found that the new compositions are excellent materials for treating heat exchange tubes, heat exchange tube sheets, heads and the like. The compositions form a strong corrosion resistant coating when applied according to the process of the invention. In addition, it was surprisingly found that the resulting coatings inhibit the formation of mineral scale depositions during operation of the heat exchanger.

I claim as my invention:

1. A process for forming a corrosion resistant coating on a metal surface while the surface is immersed in fresh water which comprises applying to the surface a putty-like mixture of (1) a liquid polyepoxide containing only carbon hydrogen and oxygen and having more than one vicepoxy group, (2) from 5% to 50% stoichiometric excess of a polyamide of a polycarboxylic acid containing at least 7 carbon atoms and an aliphatic polymine which polymide contains free amino groups, and (3) from 0.5% to 5% by weight of a water soluble salt of an alkali metal and an inorganic polybasic acid, and then allowing the mixture to harden while in contact with the water.

2. A process for forming a corrosion resistant coating on a metal surface while the surface is immersed in fresh water which comprises applying to the surface a putty-like mixture of (1) a liquid polyepoxide containing only carbon hydrogen and oxygen and having more than one vic-epoxy group, (2) from 5% to 50% stoichiometric excess of a polyamide of a polycarboxylic acid containing at least 7 carbon atoms and an aliphatic polyamine which polyamide contains free amino groups, and (3) from .05% to 5% by weight of sodium citrate, and then allowing the mixture to harden while in contact with the water.

References Cited

UNITED STATES PATENTS

| 3,208,955 | 9/1965 | Proops | 260—47 |
| 3,201,360 | 8/1965 | Proops et al. | 260—47 |
| 3,159,499 | 12/1964 | Jorda | 260—837 |
| 3,160,518 | 12/1964 | Jorda | 260—18 |
| 3,112,294 | 11/1963 | Newey | 260—18 |
| 3,018,262 | 1/1962 | Shroeder | 260—18 |
| 2,774,691 | 12/1956 | Schroeder et al. | 260—47 |

OTHER REFERENCES

Epoxy Resins, Lee Neville, McGraw-Hill, New York, 1957, pp. 282–283.

DONALD E. CZAJA, *Primary Examiner.*

C. WARREN IVY, *Assistant Examiner.*

U.S. Cl. X.R.

117–2, 161; 260–2, 18, 37, 47